(12) United States Patent
Jouanneau-Si Larbi et al.

(10) Patent No.: US 8,475,962 B2
(45) Date of Patent: Jul. 2, 2013

(54) COMPOSITION FOR MANUFACTURE OF ELECTRODES AND ELECTRODES AND BATTERIES RESULTING THEREFROM

(75) Inventors: Séverine Jouanneau-Si Larbi, Sillans (FR); Willy Porcher, Avrille (FR); Bernard Lestriez, Nantes (FR); Dominique Guyomard, Sautron (FR)

(73) Assignees: Commissariat a l'Energie Atomique, Paris (FR); Centre National de la Recherche, Paris (FR)

( * ) Notice: Subject to any disclaimer, the term of this patent is extended or adjusted under 35 U.S.C. 154(b) by 633 days.

(21) Appl. No.: 12/602,865

(22) PCT Filed: Jun. 4, 2008

(86) PCT No.: PCT/FR2008/000758
§ 371 (c)(1),
(2), (4) Date: Mar. 11, 2010

(87) PCT Pub. No.: WO2009/004182
PCT Pub. Date: Jan. 8, 2009

(65) Prior Publication Data
US 2010/0209778 A1    Aug. 19, 2010

(30) Foreign Application Priority Data

Jun. 4, 2007  (FR) ...................................... 07 03940

(51) Int. Cl.
*H01M 4/40* (2006.01)
(52) U.S. Cl.
USPC ................. 429/231.95; 106/241; 106/287.35; 252/506

(58) Field of Classification Search
USPC .......... 106/241, 287.35; 252/506; 429/231.95
See application file for complete search history.

(56) References Cited

U.S. PATENT DOCUMENTS

| 6,984,471 | B2 * | 1/2006 | Suzuki et al. ................. 429/330 |
| 2002/0048706 | A1 | 4/2002 | Mayes et al. |
| 2003/0134196 | A1 | 7/2003 | Chen et al. |
| 2004/0048154 | A1 | 3/2004 | Jung et al. |

FOREIGN PATENT DOCUMENTS

| DE | 101 18 639 | 10/2002 |
| DE | 102 50 747 | 5/2004 |
| EP | 0 905 804 | 3/1999 |
| EP | 1 722 439 | 11/2006 |
| WO | WO 95/24741 | 9/1995 |
| WO | WO 02/47188 | 6/2002 |
| WO | WO 2006/052313 | 5/2006 |

OTHER PUBLICATIONS

Cassagneau et al., "High Density Rechargable Lithium-Ion Batteries Self-Assembled from Graphite Oxide Nanoplatelets . . . ", Advanced Materials, 10, pp. 877-881, 1998.

* cited by examiner

*Primary Examiner* — Stuart Hendrickson
(74) *Attorney, Agent, or Firm* — Morgan, Lewis & Bockius LLP

(57) ABSTRACT

Composition for the manufacture of composite electrodes usable in electrochemical devices and comprising at least: (i) one lithium insertion material; (ii) one electronic conducting material; (iii) one amino-functional cationic polyelectrolyte; (iv) water.

25 Claims, No Drawings

COMPOSITION FOR MANUFACTURE OF ELECTRODES AND ELECTRODES AND BATTERIES RESULTING THEREFROM

The present application is a U.S. National Phase Application of International Application No. PCT/FR2008/000758 (filed Jun. 4, 2008), which claims priority to French Patent Application No. 0703940 (filed Jun. 4, 2007), all of which are hereby incorporated by reference in their entirety.

The invention relates to a novel composition fabricating composite electrodes use in electrochemical devices such as batteries, supercapacitances, cells and asymmetric cells.

In particular, lithium batteries are a highly promising storage source for the electric vehicle or the hybrid vehicle and are already well installed in portable equipment. The performance of these batteries, in terms of energy density (measured in Wh/kg or in Wh/l) is significantly superior to that of nickel-cadmium (NiCd) batteries and nickel-metal hydride (NiMH) batteries.

These lithium batteries comprise negative electrodes in particular. The negative electrode of the storage battery (elementary part of a battery) is either made from lithium metal (referred to as the Li-metal technological system), or a lithium host compound, for example graphite (referred to as the lithium-ion technological system).

A Li-ion battery accordingly comprises two composite electrodes which generate an electric current by means of electrochemical reactions. A composite electrode for Li-ion batteries consists of an electronic conductor and an insertion material which, according to its electrochemical potential, confers on it the property of a cathodic or anodic material.

During use, hence during the discharge of the storage battery, the lithium released by the negative (host insertion material <H>), in $Li^+$ ion form, migrates across the ionic conducting electrolyte and is inserted into the crystal lattice of the active material of the positive electrode (lithium insertion compound of the metal oxide type <MLi>). The passage of each $Li^+$ ion into the internal circuit of the storage battery is exactly offset by the passage of an electron into the external circuit, thereby generating an electric current. The specific energy density released by these reactions is both proportional to the potential difference between the two electrodes ant to the quantity of lithium that is intercalated in the insertion material. It is also inversely proportional to the total mass of the system.

The electronic conductivity of the insertion material alone is generally insufficient for power applications. Thus an electronic conducting lattice must allow the flow of electrons from the current collector to the insertion material. An electronic conducting agent is added to the electrode.

Typically, a method for obtaining a thick layer (between 1 µm and 1 mm) of composite electrode uses a solvent which can decompose in three steps: an ink is first prepared by incorporating and mixing the insertion material, the electronic conductor and a binder with a solvent. The dispersion and uniformity of the constituents of the ink are requisite properties for obtaining a satisfactory composite electrode. A method such as coating or screen printing then serves to shape the composite electrode directly on the current collector from the ink. According to the technique employed, the rheological properties of the ink are optimized. Finally, the composite electrode is dried by evaporation of the solvent, and the binder then serves to ensure the mechanical strength of the electrode.

Overall, the quantity of electronic conductor to be added must remain minimal in order to maximize the energy densities of the battery. Thus the therefore meet three conditions. First, from the electronic conducting lattice must be effective and therefore meet three conditions. First, form the macroscopic standpoint, the electrode must have a high volumetric electronic conductivity. The percolation threshold, the critical point at which the electrode passes from insulating to conducting behavior, must be reached. From the microscopic standpoint, the density of contact points at the surface of the insertion material with the electronic conducting lattice must be high, so that the number of triple points between the electrolyte, the insertion material and the electronic conductor, that is the sites or the insertion and deinsertion reaction, are numerous. A third condition may be set to improve the electronic conductivity. The contacts between the insertion material and the electronic conductor must be of good quality in order to reduce the contact resistance. It is preferable have planar-planar contacts rather than point contacts for example. It is also preferable to reduce the distance between the insertion material and the electronic conducting agent at the location of these contacts.

The following problems are solved by the present invention: preparing a composite electrode by the aqueous method, with an improved energy density compared to prior art electrodes, good mechanical strength, that is sufficient strength for the electrode to be handled during the fabrication of the battery, and high electrochemical performance in terms of power, such as the Li insertion/deinsertion capacity which must be high, in particular at high current rates. An attempt was made to develop a composition for the preparation of an electrode which does not require control of the pH during this fabrication, contrary to the compositions of the prior art.

The conventional method for preparing a cathode for a lithium-ion storage battery is the following: first, an insertion material (for example $LiCoO_2$, $LiNiO_2$, $LiMn_2O_4$, $LiMnO_2$ or a mixture of these materials) or aggregates of the insertion material, having a size between 1 and 50 µm, are dispersed in an organic solvent. Electronic conducting carbon black and a binder such as polytetrafluoroethylene or polyvinylidene difluoride are added to this dispersion. The mixture is then applied and pressed on an aluminum sheet which serves as a current collector.

Aqueous dispersions for preparing an elect de have been described in WO 02/47188. These dispersions have the advantage of all requiring the use of organic solvents, which are considered harmful. Instead of a conventional binder, the compositions comprise a water soluble macromolecule such as gelatin, derivatives of cellulose or other natural polyelectrolytes. According to the method taught by this document, the self-assembly of the composition takes place by flocculation of the carbon black with the particles of insertion material pretreated with gelatin (or various natural polyelectrolytes). The quantity of carbon to be introduced to provide an effective percolation lattice can thus be reduced and the energy density of the electrode is optimized. The polarization of the cathodes prepared in this way is also considerably reduced.

However, natural polyelectrolytes, such as gelatin, have chemical structures that are often complex and non-uniform. Moreover, their quality varies from one batch to another, and this raises problems of reproducibility and quality of performance.

In the method taught by this document, the self-assembly of the composition takes place by flocculation of carbon black with the particles of insertion material, which has the drawback of using high molecular weight polyelectrolytes and a thickening of the polymer located between the carbon black and the particles of insertion material.

The pH, in the prior art method, controlled to obtain a sea urchin type polymer configuration, which has a drawback of complicating the method and not being compatible with all insertion materials.

The natural pH of an aqueous suspension of oxide is generally between 7 and 10 and its zero charge point is generally lower than 7. Thus an oxide naturally has negative surface charge. For electronic conductors, and more precisely for a carbon black, due to its preparation at high temperature, its surface charge is generally low because it has very few ionizable groups at the surface. For its zero charge point, values grouped around 6.5 are reported. Thus in aqueous suspension, the surface charges of the two materials the composite electrode have the same sign.

Some oxides do not lend themselves to a modification of the pH in order to influence the surface charge of the oxide. For a suspension of $LiFePO_4$ for example, the introduction of an acid or a base causes a substitution of the lithium ions by the protons or a substitution of the phosphate ions by the hydroxide ions, thereby giving rise to a change in the oxide on the one hand, and on the other hand, the impossibility of controlling the pH of the suspension.

An attempt was therefore made to develop a method and compositions which offer access to electrodes with higher energy density, which have improved performance, with a much lower interfacial resistance between the current collector and the composite electrode. Moreover, the method developed does not require any modification of the pH.

One the objects of the present invention was to promote the coupling of the insertion material in suspension and the conducting agent by a self-assembly mechanism based on the complementarity of the sign of the surface charge of the two materials of composite electrode for Li-ion batteries.

The solution to the problems described above was to develop a novel composition for the fabrication of a composite electrode.

The composition of the invention is characterized in that it comprises:
  (i) a lithium insertion material;
  (ii) an electronic conductor;
  (iii) an amino-functional cationic polyelectrolyte
  (iv) water.

The composition of the invention is advantageously prepared freshly at the time of the fabrication of the electrode. It results from the mixing of two compositions which are defined below:
  An aqueous suspension A, which comprises one the two materials of the electrode which are insertion materials based on lithium (i) and the electronic conductor (ii), and at least one amino-functional cationic polyelectrolyte (iii), the quantity of polyelectrolyte being between $1.10^{-5}$ and 5% by weight of the quantity of material (i) or (ii) also present in A and preferably between $1.10^{-3}$ and 1%.
  A composition B, which may be in the form of a powder or in the form of a suspension in a solvent, advantageously an aqueous suspension, comprises the other material of the electrode selected from (i) and (ii).
  Furthermore, the composition B may optionally comprise one or more components selected from:
  a dispersant,
  a synthetic anionic polyelectrolyte.

This combination of the suspension A and the composition B constitutes another object of the invention.

In more detailed manner:
For fabricating a cathode:
The cathode insertion material, arbitrarily defined as having an electrochemical potential higher than 2 V compared to the lithium pair, is advantageously selected from the group consisting of:
  Transition metal oxides having a spinel structure of the $LiM_2O_4$ type where M is metal atom containing at least one of the metal atoms selected from the group formed by Mn, Fe, Co, Ni, Cu, Mg, Zn, V, Ca, Sr, Ba, Ti, Al, Si, B and Mo.
  Preferably, the transition metal oxides having a spinel structure are of the $LiM_2O_4$ type where M is a metal atom containing at least one of the metal atoms selected from the group formed by Mn and Ni.
  Transition metal oxides having a lamellar structure of the $LiMO_2$ type where M is a metal atom containing at least one of the metal atoms selected from the group formed by Mn, Fe, Co, Ni, Cu, Mg, Zn, V, Ca, Sr, Ba, Ti, Al, Si, B and Mo.
  Preferably, the transition metal oxides having a lamellar structure are of the $LiMO_2$ type where M is a metal atom containing at least one of the metal atoms selected from the group formed by Mn, Co and Ni.
  Oxides having a polyanionic frame of the $LiM_y(XO_z)_n$ type where M is a metal atom containing at least one of the metal atoms selected from the group formed by Mn, Fe, Co, Ni, Cu, Mg, Zn, V, Ca, Sr, Ba, Ti, Al, Si, B and Mo and X is an atom selected from the group formed by P, Si, Ge, S and As, and y, z and n are positive integers.
  Preferably, the oxides having a polyanionic frame have an olivine structure such as $LiFePO_4$.
  Vanadium-based oxides.

For fabricating an anode:
The anode insertion material, arbitrarily defined as having an electrochemical potential lower than 2 V compared to the lithium pair, is advantageously selected from the group consisting of: a lithium alloy; a nanodispersion of a lithium alloy in a lithium oxide; carbon; graphite; a lithium titanium spinel $Li_{1+y}Ti_{2x-x/4}O_4 (0 \leq x \leq 1,\ 0 \leq y \leq 1)$; a lithium and transition metal nitride; a titanium oxide, or a mixture of two or more of these materials.

The electronic conductor is a material having a conductivity higher than $1\ S \cdot cm^{-1}$ at 25° C. Advantageously, the electronic conductor has a grain size distribution lower than that of the insertion material to minimize the fraction of electronic conductor to be incorporated and thereby maximize the energy density of the Li-ion battery. Advantageously, the electronic conductor has a high specific surface area, higher than $10\ m^2 \cdot g^{-1}$ in order to minimize the fraction of electronic conductor to incorporated and thereby maximize the energy density of the Li-ion battery. Although the electronic conduct is not limited to certain substances, is preferably selected from the group formed by carbon black and active carbon. A mixture of two or more types of electronic conductors may be employed in order to minimize the quantity of electronic conductor to be incorporated and thereby maximize the energy density of the Li-ion battery.

In the context of the present invention, polyelectrolyte is any water soluble polymer which, in solution, carries numerous ionizable groups (at least 20% of the monomers), which generate electrostatic charges. The existence of electrostatic charges along the molecular chain causes medium and short range interactions, conferring characteristic physicochemical properties on the polyelectrolytes. Polyelectrolytes have many fields of application: medicine, pulp and paper, paint, agricultural processing industry, cosmetics, pharmaceuticals, water treatment, etc. Polyelectrolytes are used for their rheological and adsorption properties at the interfaces, which are generally irreversible.

A surfactant is different from a polyelectrolyte in the fact that it only has a few ionizable groups, generally one to three.

The various polyelectrolytes are classified according to their origin; thus there are:

Natural polyelectrolytes,

Synthetic polyelectrolytes, chemically modified biopolymers.

They are also classified according their properties:

Anionic polyelectrolyte pH>pKa,

Cationic polyelectrolyte pH<pKa,

Neutral polyelectrolyte.

The polyelectrolyte must meet the various requirements connected with the introduction of a polymer into an electrode for Li-ion storage battery, that is, sufficient elasticity withstand the expansions during the insertion and deinsertion cycles, chemical and especially electrochemical stability. Its potential stability window must in fact be compatible with that of the electrode considered in the battery, which depends on the materials and the operating potentials.

Amino-functional cationic polyelectrolytes are infinitely derivable. Synthetic polyelectrolytes are preferably selected. These are polymers produced by the combination of monomers carrying functions selected from the following list: aminal, oxime, nitrile, imine, primary amine, secondary amine, tertiary amine, pyridine, enamine, ynamine, hydrazone, amide, amino acid, amino ester, isocyanate, nitrene, carbamate, carbazate, hydrazine, oxaziridine, β-lactam, enamide, cyanhydrin, pyrimidine, hydropyrimidine, pyrazine, piperazine, imidazolidine, pyridazine, aziridine, azetidine, pyrrolidine, piperidine, oxazole, oxazoline, oxazolidine, oxazolidinone, imidazoles, pyrrole, carbamic acid, urea, imide, hydroxymic acid, triazole, and isooxazole, optionally in combination with nonionic monomers.

A number of examples are given for illustration:

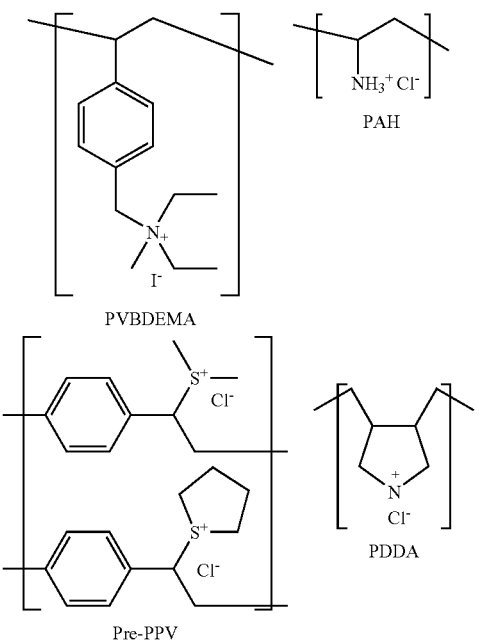

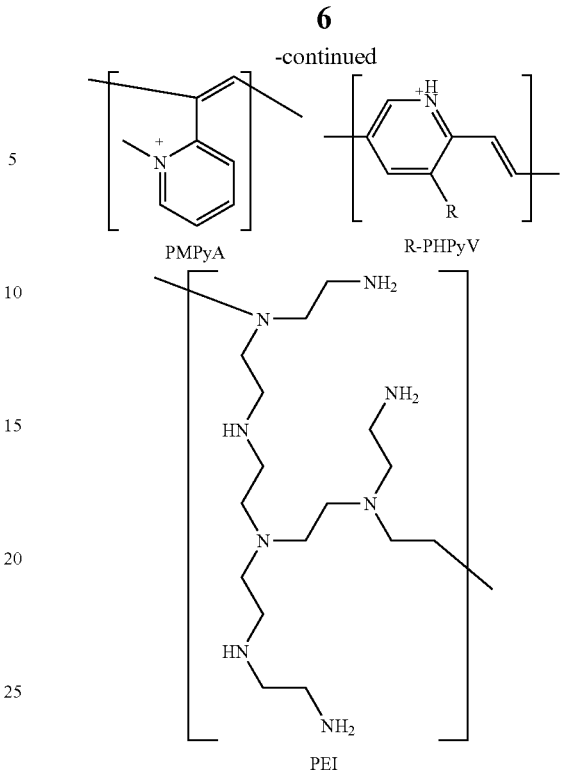

Preferably, the amino-functional cationic polyelectrolytes are selected from: poly(allylamine hydrochloride) (PAH), poly(diallyldimethylammonium chloride) (PDDA), poly(vinylpyridine)(PVPy), polyaniline (PANi), polyethylenimine (PET) end poly(N,N,N-trimethylammonium ethyl acrylate chloride) and mixtures thereof.

Preferably, this amino-functional cationic polyelectrolyte is synthetic in order to enhance its effectiveness to influence the surface charge of the material on which it is adsorbed. Thus the quantities of amino-functional cationic polyelectrolytes to be introduced are commensurately lower with a synthetic polyelectrolyte. The energy density of the Li-ion storage battery is thus commensurately higher. Moreover, the interfacial resistance, caused by the adsorbed polymer, between the insertion material and the electronic conductor, is commensurately lower for a synthetic polymer because it is proportional to the exponential of the thickness of the adsorbed polymer.

A quantity cationic polyelectrolyte introduced in A serves to obtain the self-assembly of the composition, but is nor sufficient for the polyelectrolyte to play the role of binder, or adhesive, to hold the various elements of the electrode together mechanically.

The self-assembly, or coagulation caused by the substrate, has been defined in particular by A. Basch et al., Journal of Applied Electrochemistry (2005), 35:169-176: it is a method for coating a surface of any type (ceramic, glass, polymer, metal) with a material composed of fine particles. This method produces surface coating which is practically binder-free, by small particles. This method is based on the flocculation or coagulation of the particles in suspension when the two compositions are mixed and contacted with a substrate.

Anionic polyelectrolytes are polymers produced by the combination of monomers carrying fun ions selected from the following list: carboxylic acid, sulfonic acid and salts thereof, sulfates, optionally in combination with nonionic monomers.

For anionic polyelectrolytes, a number of examples are provided for illustration:

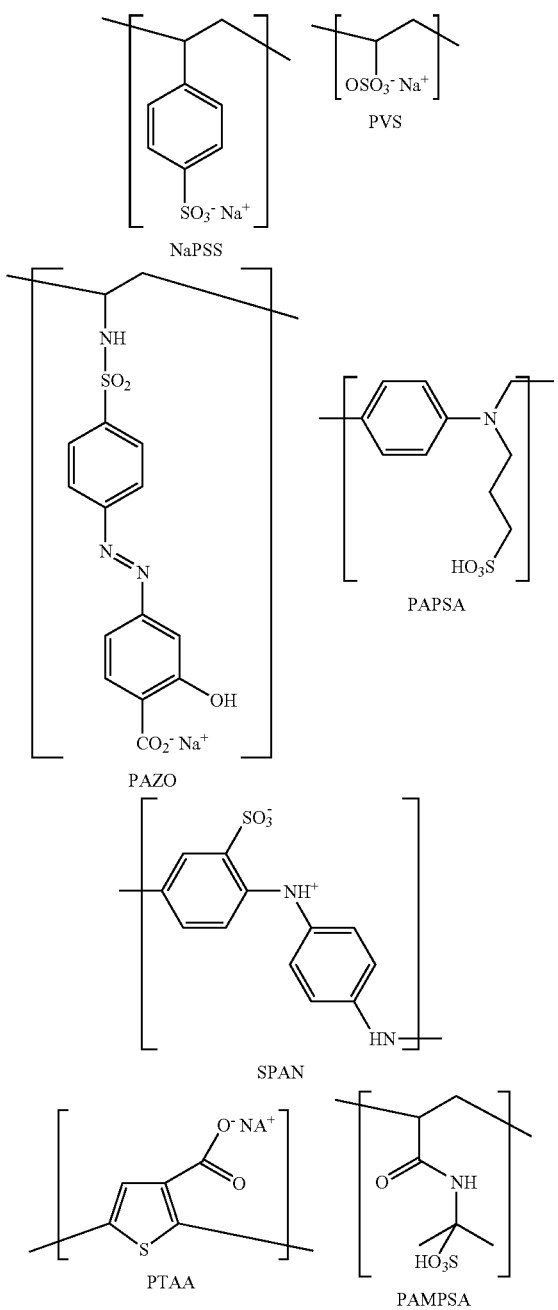

Preferably, the anionic polyelectrolyte used in the present invention has sulfonic acid and sulfate ester groups, such as respectively sodium polystyrene sulfanate and sodium polyvinyl sulfate, and the counter-ions may be different from sodium.

The dispersant is a material selected from the group of nonionic surfactants. Preferably, 4-(1,1,3,3,-tetramethylbutyl)phenyl-polyethylene glycol (sold under the trade name Triton®, X100) is employed.

In the suspension A, the quantity of polyelectrolyte to be introduced depends on the chemical structure of the polyelectrolyte, on the specific surface area and on the surface charge of the material which the polyelectrolyte is adsorbed. This quantity of polyelectrolyte is between $1.10^{-5}$ and 5% by weight of the quantity of electrode material (insertion material (i) or electronic conductor (ii)) also present in A. This quantity of polyelectrolyte is preferably between $1.10^{-3}$ and 1% by weight of the quantity of electrode material ((i) or (ii)).

In the composition B, there may be:
either simply the second electrode material called material B (that of (i) and (ii) which is not in the suspension A),
or the second electrode material, called material B (that of (i) and (ii) which is not in the suspension A), in a solvent with optionally:
A dispersant: the role of this dispersant is twofold. It serves to wet this material by the solvent and to disperse it by chemical action. The dispersant is preferably a surfactant. The quantity of the dispersant depends on the chemical structure of the dispersant, the specific surface area and nature of the surface of the material on which the dispersant is adsorbed. This quantity of dispersant is between $1.10^{-5}$ and 25% by weight of the quantity of material B. This quantity of dispersant is preferably between $1.10^{-3}$ and 5% by weight of the quantity of material B.
A synthetic anionic polyelectrolyte: the role of this polyelectrolyte is threefold. It may serve to wet this material by the solvent, disperse this material by chemical action, and fix the surface potential of this material. The quantity of polyelectrolyte is adjusted according to the value of the zeta potential of the material to be reached. This quantity of polyelectrolyte is between $1.10^{-5}$ and 5% by weight of the quantity of material B. This quantity of polyelectrolyte is preferably between $1.10^{-3}$ and 1% by weight of the quantity of material B.

The solvent of the composition B is advantageously water. It may also selected from solvents miscible with water and mixtures thereof.

In the composition of the invention, resulting from the mixing of composition A (suspension) and composition B, optionally a thickener and a binder may be added to give the composition rheological properties adapted to the shaping technique, or to improve the kinetic stability of the composition or ensure the mechanical strength of the electrode. The quantities of thickener and binder are preferably between 0 and 10% by weight of the total weight (1)+(ii)+(iii).

In the composition of the invention, and in the combinations issuing therefrom, the electronic conductor (ii) accounts for between 1 and 101 by weight of the total weight of the components (i)+(ii)+(iii), advantageously between 1 and 5%. The quantity of insertion material (ii) is between 70 and 99% by weight of the total weight of the components (i)+(ii)+(iii), preferably between 85 and 99% by weight.

The dry extracts of the compositions of the invention are adjusted so that the stresses during drying are acceptable to have good mechanical strength of the composite electrode. Advantageously, they are between 25 and 70% by weight. The preparation procedure does not basically have any filtration, rinsing or drying steps.

Steps of mechanical stirring or ultrasonic treatment may be provided for preparing composition A, or composition B. On completion of the mixing suspension A with composition B, the composition of the invention is generally used almost immediately to fabricate an electrode. However, a storage period may be scheduled, provided that this composition is maintained with stirring and under conditions which serve to prevent the evaporation of the solvents.

For composition A, a preparation method may be provided in at least two steps:
- dissolution of the amino-functional cationic polyelectrolyte (iii) in water, then
- introduction of a first electrode material selected from: (i) an insertion material and (ii) an electronic conductor.

For composition B, in the case in which it comprises a solvent and a compound selected from a dispersant and/or an anionic polyelectrolyte, a preparation may be provided in at least two steps:
- dissolution of the dispersant and/or the anionic polyelectrolyte in the solvent, then
- introduction of the second material selected from (i) an insertion material and (ii) an electronic conductor.

Depending on each case, a step of filtration of composition B may be provided.

The invention also relates to a method for preparing a composition for the fabrication of a composite electrode, said method comprising the following steps:
- (a) preparation of a composition A as described above,
- (b) preparation of a composition B as described above,
- (c) mixing of the compositions A and B.

This mixing may be supplemented by mechanical stirring and/or ultrasonic treatment.

The invention further relates to a method for fabricating a composite electrode, said method being characterized in that:
1. a composition is prepared according to the method described above,
2. the composition is applied to a current collector.

The composition is applied to the current collector in a manner known per se by coating or by screen printing, but also by other deposition methods such as spraying, sputtering. Such methods are described in "Materials Science and Technology, A Comprehensive Treatment", vol. 17A, Part I VCH, 1996.

The invention further relates to an electrode comprising a current collector on which a layer of composition described above has been deposited.

The current collector is preferably two-dimensional conducting support, such as a solid or perforated strip based on carbon or metal, for example made from copper, nickel, steel, stainless steel or aluminum.

The thickness of the deposition layer after drying may be between 1 μm and 1 mm.

Compared to a formulation of a composite electrode without polyelectrolyte, the introduction of an amino-functional cationic polyelectrolyte has many advantages:
- The wetting, by the solvent of the composition, of the material on which the polyelectrolyte is adsorbed, is improved. The presence of the ionizable groups, caused by the adsorption of the polyelectrolyte, on the surface of the material, decreases its surface tension.
- The dispersion in the composition of the material on which the polyelectrolyte is adsorbed is better and the electrostatic repulsion stabilizes the suspension, thereby limiting aggregation. The quantity of polyelectrolyte is fixed so that the zeta potential of the material with the adsorbed polyelectrolyte is higher than an absolute value of 30 mV. This quantity of added polyelectrolyte therefore depends on the chemical structure of the polyelectrolyte, on the specific surface area and on the surface charge of the material on which the polyelectrolyte is adsorbed. This dispersion may be enhanced by mechanical or ultrasonic action.
- For a powder formed of elementary particles which correspond to the definition of colloids, the kinetic stability of the suspension of insertion material is guaranteed. Thus the polyelectrolyte participates in obtaining thick electrodes having a uniform thickness.
- When the second material is added the suspension of the material on which the polyelectrolyte is adsorbed, and also during the drying phase, the coupling between the two materials is promoted because of the opposite sign of their surface charges. Thus, the number of contact points between the insertion material and the electronic percolator is slightly increased and the contacts between the two materials are more intimate. On the contrary, for compositions with materials having surface charges with the same sign, during the drying, the two phases are locally segregated with a low number of contacts between the two materials and a quality of the contacts which makes them similar to point contacts.
- The invention has the advantage of promoting effective contacts between the current collector and the material on which the polyelectrolyte is adsorbed during the drying phase. If the current collector is aluminum, it is then covered with alumina which is an oxide and carries a negative sign at the usual pH. Thus, by adsorbing an amino-functional cationic polyelectrolyte, the formation of numerous and non-resistive contacts with the current collector is promoted.
- The coupling between the two materials caused by the polyelectrolyte also participates in the mechanical strength of the composition electrode.

Finally, compared to the prior art method, the relative advantages provided by the inventive method are the following:
- The fraction of polyelectrolyte to be introduced is lower because of the selectivity of the polyelectrolyte groups introduced. The density is therefore higher.
- The layer of polyelectrolyte between the insertion material and the electronic conductor is lower. The interfacial resistance caused by the adsorbed polymer is therefore much lower and the performance of the composite electrodes is far better for high current densities.
- The method does not require a modification of the pH.
- The contacts with the current collector are promoted. The interfacial resistance between the current collector and the composite electrode is much lower.
- $LiFePO_4$ can be introduced as the cathode material.

The invention further relates to an electrochemical device comprising an electrode of the invention, whether the cathode or the anode. The other electrode may be either a lithium ion electrode, comprising a lithium ion insertion material as described above, or a lithium metal electrode.

The electrochemical device further comprises a solution of a salt of which the cation contains at least one lithium ion, such as for example $LiClO_4$, $LiAsF_6$, $LiPF_6$, $LiBF_4$, $LiR_FSO_3$, $LiCH_3SO_3$, $LIN(R_FSO_2)_2$, $LiC(R_FSO_2)_3$, etc. in an aprotic solvent (ethylene carbonate, propylene carbonate, dimethyl carbonate, diethyl carbon, methyl ethyl carbonate, dimethyl carbonate, whole serving as electrolyte (ionic conductor).

The electrochemical devices the invention may be used in any common application of these devices, such as for example motor vehicles, portable electronic equipment (walkman, telephone, computer, video game console, etc.).

EXAMPLE

Fabrication of a Lithium-Ion Battery

A lithium battery is fabricated containing a positive electrode prepared from $LiFePO_4$ and an amino-functional cationic polyelectrolyte, following the preparation procedure as follows:

For the positive electrode:

A suspension A of LiFePO$_4$ and polyethylenimine (Mw=1200 g/mol) is homogenized at 20 rpm for 24 h. For the dry material, it consists of 99.9% LiFePO$_4$ and 0.1% PEI.

Simultaneously, a suspension B of Carbone Super P® (Timcal Graphite & Carbone) and Triton® X100 (Union Carbide Corporation) is homogenized at 200 rpm for 24 h. For the dry material, is consists of 95% Carbone Super P and 5% Triton® X100. The preparation of this suspension terminates with an ultrasonic treatment for five minutes.

The suspensions A and B are mixed (with a ratio of 95:5) for 15 min at 10 000 rpm.

A suspension containing a thickener based on HPMC (hydroxypropylmethylcellulose) (Mn=86 000 g/mol) and a suspension containing a binder such as a mixture of PVA-PEG (poly(vinyl alcohol)-poly(ethylene glycol)) (Mw=78 000 g/mol for PVA), are added with respective percentages of 2 and 3% in the final electrode.

The suspension is stirred at 10 000 rpm for 15 min.

The composition is deposited on an aluminum current collector (20 μm thick).

The salt the battery is LiPF$_6$ (1M) and the aprotic solvent mixture of ethylene carbonate, propylene carbonate and dimethyl carbonate in the proportion 1:1:3.

For the negative electrode:

A suspension A of Carbone Super P® (Timcal Graphite & Carbone) and of poly(vinylpyridine) (Polysciences Ltd.) is homogenized at 200 rpm for 24 h. For the dry material, it consists of 99.5% of Carbone Super P® and 0.5% PVPy. The preparation of this suspension terminates in an ultrasonic treatment of 5 min.

The suspension A and Li$_4$Ti$_5$O$_{12}$ are mixed (with a ratio of 2:98) for 15 min at 10 000 rpm.

An aqueous suspension containing 1 and 2% respectively of thickener and binder is added. The thickener is a carboxymethyl cellulose (Mw=25 000 q/mol) and the binder is a styrene butadiene copolymer (BASAF).

The composition is deposited on a copper current collector (thickness 20 μm).

The invention claimed is:

1. A combination comprising an aqueous suspension A and a composition B, wherein the aqueous suspension A comprises:
one of the two materials selected from:
(i) lithium insertion materials,
(ii) an electronic conductor, and
(iii) at least one amino-functional cationic polyelectrolyte selected from polymers produced by the combination of monomers carrying functions selected from the group consisting of: aminal, oxime, nitrile, imine, primary amine, secondary amine, tertiary amine, pyridine, enamine, ynamine, hydrazone, amide, amino acid, amino ester, isocyanate, nitrene, carbamate, carbazate, hydrazine, oxasiridine, β-lactam, enamide, cyanhydrin, pyrimidine, hydropyrimidine, pyrazine, piperazine, imidazolidine, pyridazine, aziridine, azetidine, pyrrolidine, piperidine, oxazole, oxazoline, oxazolidine, oxazolidinone, imidazoles, pyrrole, carbamic acid, urea, imide, hydroxymic acid, triazole, and isooxazole, alone or in combination with nonionic monomers,
the quantity of polyelectrolyte being between $1.10^{-5}$ and 5% by weight of the quantity of material (i) or (ii) also present in A and in that the composition B, which may be in the form of a powder or in the form of an aqueous suspension, comprises the other material selected from (i) and (ii).

2. The combination as claimed in claim 1, wherein the lithium insertion material is selected from the group consisting of:
transition metal oxides having a spinel structure of the LiM$_2$O$_4$ type where M is a metal atom containing at least one of the metal atoms selected from the group consisting of Mn, Fe, Co, Ni, Cu, Mg, Zn, V, Ca, Sr, Ba, Ti, Al, Si, B and Mo;
transition metal oxides having a lamellar structure of the LiMO$_2$ type where M is a metal atom containing at least one of the metal atoms selected from the group consisting of Mn, Fe, Co, Ni, Cu, Mg, Zn, V, Ca, Sr, Ba, Ti, Al, Si, B and Mo;
oxides having a polyanionic frame of the LiM$_y$(XO$_z$)$_n$ type where M is a metal atom containing at least one of the metal atoms selected from the group consisting of Mn, Fe, Co, Ni, Cu, Mg, Zn, V, Ca, Sr, Ba, Ti, Al, Si, B and Mo, and X is an atom selected from the group consisting of P, Si, Ge, S and As, and y, z and n are positive integers; and
vanadium-based oxides.

3. The combination as claimed in claim 2, wherein the lithium insertion material is selected from the group consisting of:
transition metal oxides having a spinel structure of the LiM$_2$O$_4$ type where M is a metal atom containing at least one of the metal atoms selected from the group consisting of Mn and Ni;
transition metal oxides having a lamellar structure of the LiMO$_2$ type where M is a metal atom containing at least one of the metal atoms selected from the group consisting of Mn, Co and Ni; and
oxides having a polyanionic frame with an olivine structure such as LiFePO$_4$.

4. The combination as claimed in claim 1, wherein the lithium insertion material is selected from the group consisting of: a lithium alloy, a nanodispersion of a lithium alloy in a lithium oxide, carbon, graphite, a lithium titanium spinel Li$_{1+y}$Ti$_{2x-x/4}$O$_4$ ($0 \leq x \leq 1$, $0 \leq y \leq 1$), lithium and transition metal; nitride a titanium oxide, and mixtures thereof.

5. The combination as claimed in claim 1, wherein the electronic conductor is a material having a conductivity higher than 1 S.cm$^{-1}$ at 25° C.

6. The combination as claimed in claim 1, wherein the electronic conductor has a grain size distribution lower than that of the insertion material.

7. The combination as claimed in claim 1, wherein the electronic conductor is a material having a specific surface area higher than 10 m$^2$.g$^{-1}$.

8. The combination as claimed in claim 1, wherein the electronic conductor is selected from the group formed by carbon black, active carbon and mixtures thereof.

9. The combination as claimed in claim 1, wherein the amino-functional cationic polyelectrolyte is a synthetic polyelectrolyte.

10. The combination as claimed in claim 1, wherein the amino-functional cationic polyelectrolyte is selected from the group consisting of: poly(allylamine hydrochloride) (PAH), poly(diallyldimethylammonium chloride) (PDDA), poly(vinylpyridine) (PVPy), polyaniline (PANi), polyethylenimine (PEI) and poly(N,N,N-trimethylammonium ethyl acrylate chloride) and mixtures thereof.

11. The combination as claimed in claim 1, wherein the quantity of polyelectrolyte is between $1.10^{-3}$ and 1% by weight of the quantity of material selected from the insertion material (i) and the electronic conductor (ii) also present in A.

12. The combination as claimed in claim 1, wherein the electronic conductor (ii) accounts for between 1 and 10% by weight of the total weight of the components (i)+(ii)+(iii).

13. The combination as claimed in claim 1, wherein the quantity of insertion material (ii) is between 70 and 99% by weight of the total weight of the components (i)+(ii)+(iii).

14. The combination as claimed in claim 1, wherein the composition B further comprises one or more components selected from the group consisting of:
  a dispersant, and
  a synthetic anionic polyelectrolyte.

15. The combination as claimed in claim 14, wherein the anionic polyelectrolyte has sulfonic acid and sulfate ester groups.

16. The combination as claimed in claim 14, wherein the dispersant is a nonionic surfactant.

17. The combination as claimed in claim 14, wherein the quantity of dispersant is between $1.10^{-5}$ and 25% by weight of the quantity of material selected from the insertion material (i) and the electronic conductor (ii) also present in B.

18. The combination as claimed in claim 14, wherein the quantity of anionic polyelectrolyte is between $1.10^{-5}$ and 5% by weight of the quantity of material selected from the insertion material (i) and the electronic conductor (ii) also present in B.

19. A composition resulting from the mixture of compositions A and B of the combination as claimed in claim 1, wherein the composition comprises:
  a lithium insertion material;
  (ii) an electronic conductor;
  (iii) an amino-functional cationic polyelectrolyte; and
  (iv) water.

20. The composition as claimed in claim 19, further comprising at least one compound selected from the group consisting of a thickener and a binder, in a quantity of between 0 and 10% by weight of the total weight of compounds (i)+(ii)+(iii).

21. The composition as claimed in claim 19, wherein a dry extract of the composition is between 25 and 70%.

22. A method for preparing a composition as claimed in claim 19, comprising:
  (a) preparing a composition A in at least two steps:
    dissolving the amino-functional cationic polyelectrolyte (iii) in water, then
    introducing the first material selected from the group consisting of: (i) an insertion material and (ii) an electronic conductor,
  (b) preparing a composition B, and
  (c) mixing the compositions A and B.

23. The method as claimed in claim 22, wherein the composition B comprises a solvent and a compound selected from the group consisting of a dispersant and an anionic polyelectrolyte, and wherein step (b) comprises at least the following steps:
  dissolving, the dispersant and/or the anionic polyelectrolyte in the solvent, then
  introducing the second material selected from the group consisting of (i) an insertion material and (ii) an electronic conductor.

24. A method for fabricating a composite electrode, said method comprising:
  preparing a composition following the method as claimed in claim 22, and
  applying the composition to a current collector.

25. The method as claimed in claim 24, wherein the composition is applied to the current collector by coating or by screen printing.

* * * * *